(12) United States Patent
Yoshitomi et al.

(10) Patent No.: US 11,637,308 B2
(45) Date of Patent: Apr. 25, 2023

(54) FUEL CELL SYSTEM

(71) Applicant: HONDA MOTOR CO., LTD., Tokyo (JP)

(72) Inventors: Ryoichi Yoshitomi, Wako (JP); Hideharu Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 310 days.

(21) Appl. No.: 16/544,962

(22) Filed: Aug. 20, 2019

(65) Prior Publication Data

US 2020/0067123 A1 Feb. 27, 2020

(30) Foreign Application Priority Data

Aug. 23, 2018 (JP) .............................. JP2018-156187

(51) Int. Cl.
*H01M 8/2475* (2016.01)
*H01M 8/04537* (2016.01)
*H01M 8/04828* (2016.01)
*H01M 8/04858* (2016.01)

(52) U.S. Cl.
CPC ....... *H01M 8/2475* (2013.01); *H01M 8/0494* (2013.01); *H01M 8/04552* (2013.01)

(58) Field of Classification Search
CPC ........... H01M 8/04552; H01M 8/0494; H01M 8/04955; H01M 8/2475
See application file for complete search history.

(56) References Cited

U.S. PATENT DOCUMENTS

| 2008/0003468 A1* | 1/2008 | Finkelshtain | H01M 8/04186 429/421 |
| 2009/0136807 A1* | 5/2009 | Kobayashi | H01M 8/1039 429/435 |
| 2009/0208799 A1* | 8/2009 | Homma | H01M 8/04022 429/411 |
| 2016/0013508 A1* | 1/2016 | Martinchek | H01M 8/2404 429/469 |
| 2017/0113531 A1 | 4/2017 | Imamura et al. | |
| 2017/0170507 A1* | 6/2017 | Naito | H01M 8/2483 |
| 2017/0358813 A1* | 12/2017 | Imanishi | H01M 8/24 |
| 2018/0166731 A1* | 6/2018 | Yu | H01M 8/04111 |

FOREIGN PATENT DOCUMENTS

JP 2017-77821 4/2017

* cited by examiner

*Primary Examiner* — Brian R Ohara
*Assistant Examiner* — Brent C Thomas
(74) *Attorney, Agent, or Firm* — Amin, Turocy & Watson, LLP

(57) ABSTRACT

A stack case of a fuel cell system includes a case body, a first end cover, and a second end cover. A recess is formed in an upper surface of the case body. An interruption control unit as an electrical equipment unit is placed in the recess. A plurality of first screw holes are formed in one end surface of the case body, and a plurality of second screw holes are formed in the other end surface of the case body. A first screw hole aligned with a recess in a direction in which a plurality of power generation cells are stacked together penetrates through the case body from one end surface of the case body to a side surface of the recess.

9 Claims, 3 Drawing Sheets

FUEL CELL SYSTEM

CROSS-REFERENCE TO RELATED APPLICATION

This application is based upon and claims the benefit of priority from Japanese Patent Application No. 2018-156187 filed on Aug. 23, 2018, the contents of which are incorporated herein by reference.

BACKGROUND OF THE INVENTION

Field of the Invention

The present invention relates to a fuel cell stack including a plurality of power generation cells that are stacked together, a stack case containing the fuel cell stack, and an electrical equipment unit provided for the stack case.

Description of the Related Art

For example, Japanese Laid-Open Patent Publication No. 2017-077821 discloses a fuel cell system including a stack case containing a fuel cell stack including a plurality of power generation cells that are stacked together, and an interruption control unit provided in a flat outer surface of the stack case.

SUMMARY OF THE INVENTION

In the above fuel cell system, when the interruption control unit is placed on the flat outer surface of the stack case, the length of the interruption control unit protruding from the outer surface of the stack case becomes large. In the fuel cell system, it is desirable that the electric equipment unit such as the stack case and the interruption control unit can be placed in a compact space. In particular, in the case where the fuel cell system is mounted in a fuel cell vehicle, the stack case and the electrical equipment unit need to be provided in a compact space in a collision protection case.

The present invention has been made taking the above problem into account, and an object of the present invention is to provide a fuel cell system in which a stack case and an electrical equipment unit can be placed in a compact space.

According to an aspect of the present invention, a fuel cell system is provided. The fuel cell system includes a fuel cell stack including a plurality of power generation cells that are stacked together, a stack case containing the fuel cell stack, and an electrical equipment unit provided in the stack case, wherein the stack case includes a case body configured to cover the fuel cell stack from a direction perpendicular to a direction in which the plurality of power generation cells are stacked together, a first end cover tightened to the case body by a plurality of first bolts extending in the stacking direction in a manner to cover a first opening at one end of the case body, and a second end cover tightened to the case body by a plurality of second bolts extending in the stacking direction in a manner to cover a second opening at another end of the case body, and wherein a plurality of first screw holes are formed in one end surface of the case body, and the plurality of first bolts are configured to be screwed into the first screw holes in a state where the plurality of first bolts are inserted into a plurality of first insertion holes formed in the first end cover, a plurality of second screw holes are formed in another end surface of the case body, and the plurality of second bolts are screwed into the plurality of second screw holes in a state where the plurality of second bolts are inserted into a plurality of second insertion holes formed in the second end cover, a recess is formed in an outer surface of the case body in a manner that the recess is interposed in the stacking direction between at least one of the plurality of first screw holes and at least one of the second screw holes and that the electrical equipment unit is disposed in the recess, and a first screw hole among the plurality of first screw holes aligned with the recess in the stacking direction penetrates through the case body from one end surface to a side surface of the recess.

In the present invention, since the electrical equipment unit is provided in a recess, it is possible to reduce the length of the electrical equipment unit protruding from the outer case of the case body or position the entire electrical equipment in the recess. Further, the first screw hole penetrates through an end surface of the case main body to a side surface of a recess. Therefore, in comparison with the case where the first screw hole is formed in a bag shape which does not penetrate through a side surface of the recess, it is possible to form the recess for providing the electrical equipment unit without increasing the entire length of the stack case in the stacking direction in which a plurality of the power generation cells are stacked together in the stacking direction. Therefore, it is possible to provide a stack case and an electrical equipment unit in a compact space. Thus, in the case of providing the fuel cell system in a fuel cell vehicle, it is possible to place the stack case and the electrical equipment unit in a compact space in a collision protection case.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell system according to an embodiment of the present invention will be described below with reference to the accompanying drawings.

Figure 1:
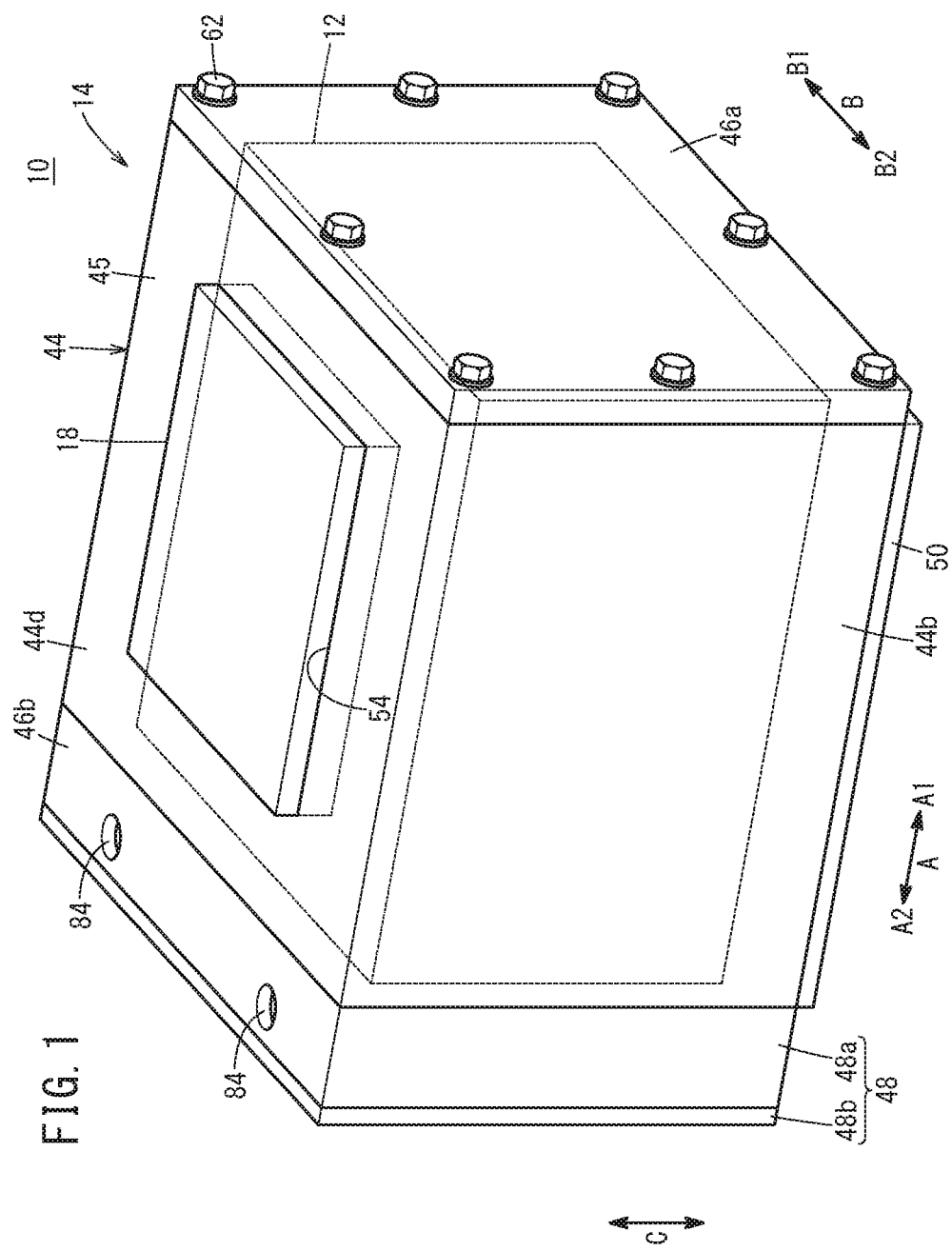
FIG. 1 is a perspective view showing a fuel cell system according to an embodiment of the present invention.
Figure 2:
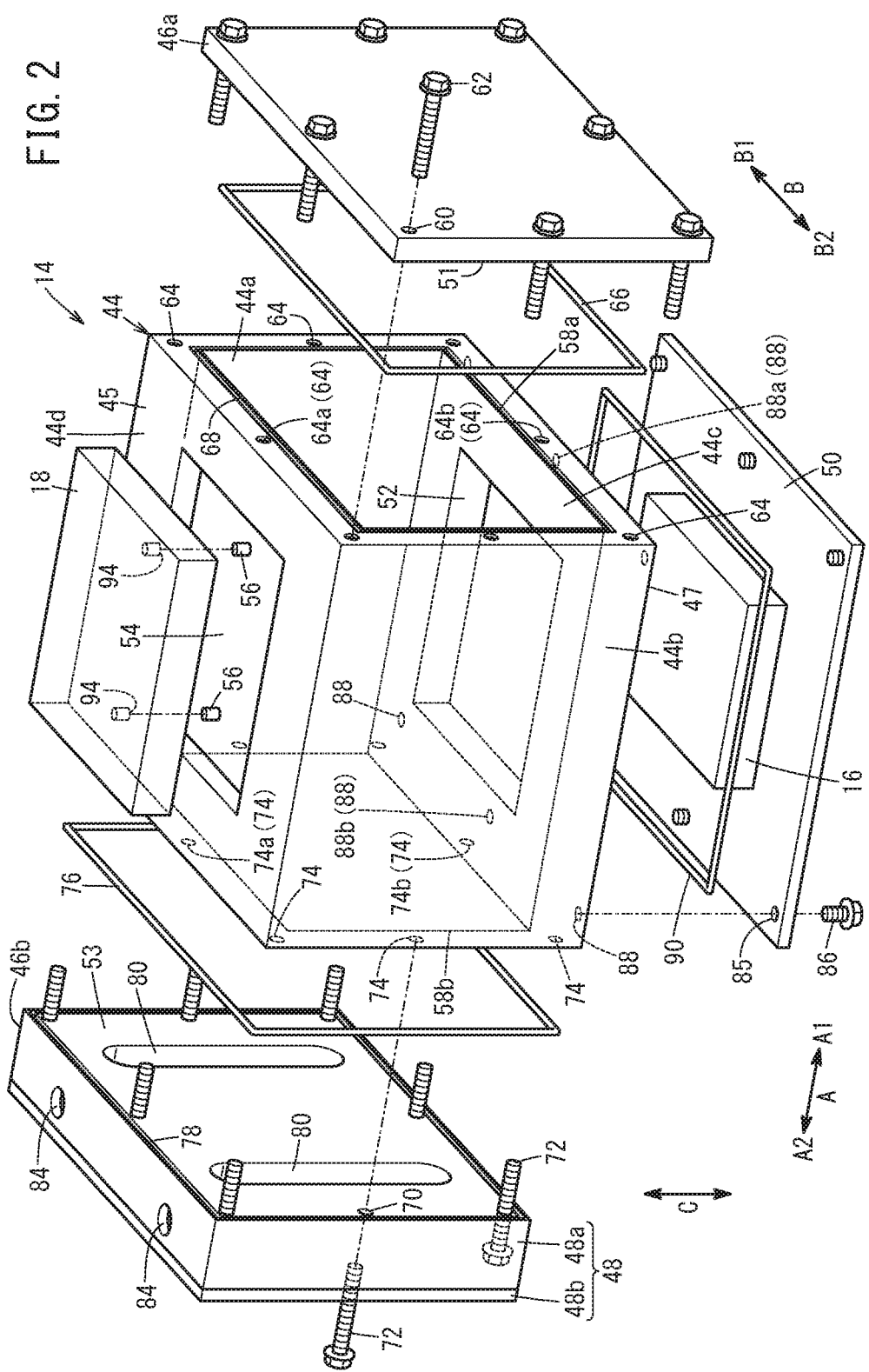
FIG. 2 is an exploded perspective view showing a stack case in FIG. 1.
Figure 3:
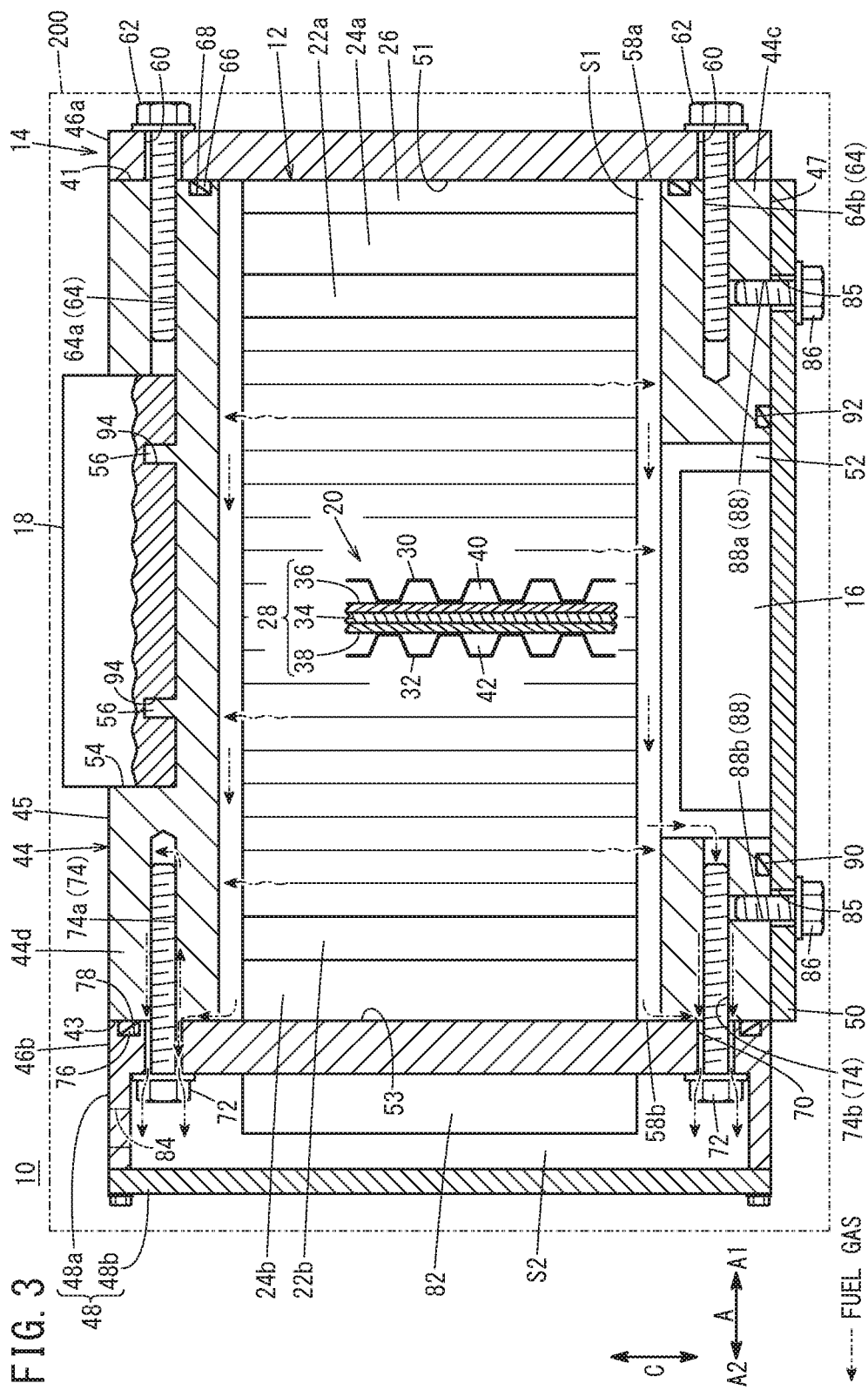
FIG. 3 is a vertical cross sectional view showing a fuel cell system in FIG. 1.

A fuel cell system 10 according to an embodiment of the present invention is mounted in a fuel cell electric automobile (fuel cell vehicle). As shown in FIGS. 1 to 3, the fuel cell system 10 includes a fuel cell stack 12, a stack case 14, a cell voltage monitoring device 16, and an interruption control unit (electrical equipment unit) 18. As can be seen from FIG. 3, the stack case 14 containing the fuel cell stack 12 and the cell voltage monitoring device 16, and the interruption control unit 18 are placed in a collision protection case 200 of the fuel cell electric automobile.

As shown in FIG. 3, the fuel cell stack 12 includes a plurality of power generation cells 20 stacked together in a horizontal direction indicated by an arrow A. The plurality of power generation cells 20 may be stacked together in a gravity direction indicated by an arrow C.

At one end of the plurality of power generation cells 20 in a stacking direction indicated by an arrow A1, a first terminal plate 22a is provided. A first insulating plate 24a is provided outside the first terminal plate 22a. A spacer 26 is provided outside the first insulating plate 24a. At the other end of the plurality of power generation cells 20 in the stacking direction indicated by an arrow A2, a second terminal plate 22b is provided. A second insulating plate 24b is provided outside the second terminal plate 22b.

The power generation cell 20 is formed by sandwiching a membrane electrode assembly 28 between a first separator 30 and a second separator 32. The first separator 30 and the second separator 32 are metal separators or carbon separators.

The membrane electrode assembly 28 includes a solid polymer electrolyte membrane 34, and an anode 36 and a cathode 38. For example, the solid polymer electrolyte membrane 34 is a thin membrane of perfluorosulfonic acid containing water. The anode 36 and the cathode 38 are provided on both sides of the solid polymer electrolyte membrane 34. A fluorine based electrolyte may be used as the solid polymer electrolyte membrane 34. Alternatively, an HC (hydrocarbon) based electrolyte may be used as the solid polymer electrolyte membrane 34.

A fuel gas flow field 40 for guiding a fuel gas (e.g., a hydrogen gas) to the anode 36 is provided between the first separator 30 and the membrane electrode assembly 28. An oxygen-containing gas flow field 42 for guiding an oxygen-containing gas (e.g., the air) to the cathode 38 is provided between the second separator 32 and the membrane electrode assembly 28.

As shown in FIGS. 1 to 3, the stack case 14 is a case containing the fuel cell stack 12. The stack case 14 has a box shape (rectangular parallelepiped shape) extending in the direction indicated by the arrow A. The stack case 14 includes a case body 44, a first end cover 46a, a second end cover 46b, a ventilation portion 48, and a lid cover 50.

The case body 44 has a rectangular annular shape covering the fuel cell stack 12 from directions (directions indicated by arrows B and C) perpendicular to the stacking direction (indicated by an arrow A) of the plurality of power generation cells 20. A space S1 is formed between the case body 44 and the fuel cell stack 12 (see FIG. 3). That is, in FIG. 2, the case body 44 includes a first wall 44a positioned in a direction indicated by an arrow B1, a second wall 44b positioned in a direction indicated by an arrow B2, a third wall 44c positioned at a lower position, and a fourth wall 44d positioned at an upper position.

As shown in FIGS. 2 and 3, a placement hole 52 is formed in an inner surface of the third wall 44c. The cell voltage monitoring device 16 for monitoring the voltage of each of the power generation cells 20 is placed in the placement hole 52. The placement hole 52 penetrates through the third wall 44c in a direction (indicated by an arrow C) perpendicular to the stacking direction of the plurality of power generation cells 20. A recess 54 is formed in an outer surface of the fourth wall 44d (upper surface 45 of the case body 44). The interruption control unit 18 is placed in the recess 54.

The recess 54 has a rectangular shape in a plan view, and extends in the stacking direction (indicated by the arrow A) of the plurality of power generation cells 20. A plurality of (two, in an example of FIG. 2) positioning projections 56 protrude upward from the bottom surface of the recess 54. It should be noted that three or more positioning projections 56 may be provided.

A rectangular first opening 58a is formed in one end surface 41 of the case body 44 (end surface in the direction indicated by the arrow A1). A rectangular second opening 58b is formed at another end surface 43 of the case body 44 (end surface in the direction indicated by the arrow A2).

The first end cover 46a is tightened to one end surface 41 of the case body 44 by a plurality of first bolts 62 extending in the stacking direction (indicated by the arrow A) of the plurality of power generation cells 20 in a manner to cover the first opening 58a from the outside. The first end cover 46a is a rectangular plate. In the state where the plurality of first bolts 62 are inserted into a plurality of first insertion holes 60 formed in the first end cover 46a, the first bolts 62 are screwed into a plurality of first screw holes 64 formed in the one end surface 41 of the case body 44. Each of the first screw holes 64 extends in the direction indicated by the arrow A.

As shown in FIG. 3, among the plurality of first screws hole 64, a first screw hole 64 aligned with the recess 54 in the stacking direction (in the direction indicated by the arrow A) (hereinafter referred to as a "first screw hole 64a") penetrates through the case body 44 from one end surface 41 to a side surface of the recess 54. Stated otherwise, the first screw hole 64a is a through hole extending in the direction indicated by the arrow A, and the first screw hole 64a is connected to the recess 54.

Among a plurality of first screw holes 64, a first screw hole 64 aligned with the placement hole 52 in the stacking direction (indicated by the arrow A) (hereinafter referred to as a "first screw hole 64b") is closed on one side of the placement hole 52 closer to one end of the case body 44 (in the direction indicated by the arrow A1). Stated otherwise, the first screw hole 64b is a hole having a bottom extending in the direction indicated by the arrow A, and has a bag shape. That is, the first screw hole 64b is not connected to the placement hole 52. Among the plurality of first screw holes 64, each of the first screw holes 64 other than the first screw hole 64a has a bottom, and has the same structure as the first screw hole 64b.

As shown in FIGS. 2 and 3, an annular inner seal member 66 for sealing a position between the one end surface 41 of the case body 44 and an inner surface 51 of the first end cover 46a is provided between the plurality of first screw holes 64 and the first opening 58a. For example, the inner seal member 66 is formed of a resin member of rubber, etc. The inner seal member 66 is provided in an inner groove 68 formed in the one end surface 41 of the case body 44 in a manner to surround the first opening 58a from the outside. It should be noted that the inner groove 68 may be formed in the inner surface 51 of the first end cover 46a (surface in a direction indicated by an arrow A2).

The second end cover 46b is tightened to the other end surface 43 of the case body 44 by a plurality of second bolts 72 extending in the stacking direction of the plurality of power generation cells 20 in a manner to cover the second opening 58b from the outside. The second end cover 46b is a rectangular plate. In the state where the plurality of second bolts 72 are inserted into a plurality of second insertion holes 70 formed in the second end cover 46b, the second bolts 72 are screwed into a plurality of second screw holes 74 formed in the other end surface 43 of the case body 44. Each of the plurality of second screw holes 74 extends in the direction indicated by the arrow A.

As shown in FIG. 3, among the plurality of second screw holes 74, a second screw hole 74 aligned with the recess 54 (hereinafter referred to as a "second screw hole 74a") in the stacking direction (indicated by the arrow A) is closed on one side of the recess 54 closer to the other end of the case body 44 in the direction indicated by the arrow A2). Stated otherwise, the second screw hole 74*a* is a hole having a bottom extending in the direction indicated by the arrow A, and has a bag shape. That is, the second screw hole 74*a* is not connected to the recess 54.

Among the plurality of second screw holes 74, a second screw hole 74 aligned with the placement hole 52 in the stacking direction (indicated by the arrow A) (hereinafter referred to as a "second screw hole 74*b*") penetrates through the case body 44 from the other end surface 43 of the case body 44 to the side surface of the placement hole 52. Stated otherwise, the second screw hole 74*b* is a through hole extending in the direction indicated by the arrow A, and is connected to the placement hole 52. It should be noted that, among the plurality of second screw holes 74, each of the second screw holes 74 other than the second screw hole 74*b* has a bottom, and has the same structure as the second screw hole 74*a*.

As shown in FIGS. 2 and 3, an outer seal member 76 for sealing a position between the other end surface 43 of the case body 44 and an inner surface 53 of the second end cover 46*b* in an air-tight manner is provided, between the plurality of second screw holes 74 and the outer surface of the case body 44. For example, the outer seal member 76 is formed of a resin member of rubber, etc. The outer seal member 76 is provided in an outer groove 78 formed in the inner surface 53 (surface in the direction indicated by the arrow A1) of the second end cover 46*b* in a manner to surround the plurality of second insertion holes 70 from the outside. However, the outer groove 78 may be formed in the other end surface 43 of the case body 44.

That is, the recess 54 is formed in an outer surface (upper surface 45) of the case body 44 in a manner that the recess 54 is interposed in the stacking direction of the plurality of power generation cells 20 between at least one (first screw hole 64*a*) of the plurality of first screw holes 64 and at least one (second screw hole 74*a*) of the plurality of second screw holes 74. Further, the placement hole 52 is formed in the inner surface (inner surface of the third wall 44*c*) of the case body 44 in a manner that the placement hole 52 is interposed in the stacking direction of the power generation cells 20 between at least one (first screw hole 64*b*) of the plurality of first screw holes 64 and at least one (second screw hole 74*b*) of the plurality of second screw holes 74.

Pipe openings 80 are formed in the second end cover 46*b* for inserting a connection pipe (not shown) connected to the fuel cell stack 12 (see FIG. 2). Auxiliary devices 82 such as a fuel gas supply apparatus and an oxygen-containing gas supply apparatus are fixed to an outer surface of the second end cover 46*b* (outer surface in the direction indicated by the arrow A2) (see FIG. 3).

As shown in FIG. 2, the ventilation portion 48 for discharging the fuel gas leaked from the fuel cell stack 12 to the outside of the stack case 14 is provided in the second end cover 46*b* in a manner to cover the plurality of second bolts 72 from the outside. The ventilation portion 48 has an internal space S2 containing the auxiliary devices 82, and functions as an auxiliary device cover. The ventilation portion 48 includes a rectangular annular ventilation case body 48*a* protruding from the second end cover 46*b* in a direction indicated by the arrow A2, and a cover member 48*b* provided in the ventilation case body 48*a* in a manner to close the opening at a protruding end of the ventilation case body 48*a*.

The ventilation case body 48*a* is positioned in an outer marginal portion of the outer surface of the second end cover 46*b* (surface in the direction indicated by the arrow A2). A plurality of (two, in an example of FIG. 1) outlet holes 84 for guiding a fuel gas to a ventilation duct (not shown) are formed in an upper surface of the ventilation case body 48*a* (see FIGS. 1 to 3). It should be noted that the outlet holes 84 may be provided on a side surface of the ventilation case body 48*a* or the cover member 48*b*.

As shown in FIGS. 2 and 3, the lid cover 50 is tightened to the case body 44 by a plurality of third bolts 86 extending in the direction in which the placement hole 52 penetrates through the case body 44 (in the direction indicated by the arrow C) in a manner to cover the placement hole 52 from the outside. In the state where the plurality of third bolts 86 are inserted into the plurality of third insertion holes 85 formed in the lid cover 50, the plurality of third bolts 86 are screwed into a plurality of third screw holes 88 formed in a surface of the case body 44 facing the lid cover 50 (lower surface 47 of the case body 44). Each of the plurality of third screw holes 88 extends in the direction indicated by the arrow C.

As shown in FIG. 3, among the plurality of third screw holes 88, third screw holes 88 positioned at one end of the case body 44 (hereinafter referred to as "third screw holes 88*a*") are through holes extending in the direction indicated by the arrow C, and connected to the plurality of first screw holes 64. Among the plurality of third screw holes 88, third screw holes 88*b* positioned at the other end of the case body 44 (hereinafter referred to as "third screw holes 88*b*") are through holes extending in the direction indicated by the arrow C, and connected to the plurality of second screw holes 74.

An annular seal member 90 is provided between the plurality of third screw holes 88 and the placement hole 52 for sealing a position between the lower surface 47 of the case body 44 and the lid cover 50 in an air-tight manner. For example, the seal member 90 is formed of a resin member of rubber, etc. The seal member 90 is provided in an annular groove 92 formed in an annular shape around an opening below the placement hole 52, on the lower surface 47 of the case body 44. It should be noted that the annular groove 92 may be formed in the inner surface of the lid cover 50.

The cell voltage monitoring device 16 monitors each of the plurality of power generation cells 20, and the cell voltage monitoring device 16 is placed in the placement hole 52. In the state where the cell voltage monitoring device 16 is placed in the placement hole 52, the cell voltage monitoring device 16 is spaced from a side surface of the placement hole 52. That is, the opening of the second screw hole 74*b* formed on a side surface of the placement hole 52 is not closed by the cell voltage monitoring device 16.

The interruption control unit 18 can interrupt the output line (high voltage output line) of the fuel cell stack 12. Specifically, in the case where the fuel cell system 10 is mounted in a fuel cell electric automobile, at the time of collision of the vehicle, the interruption control unit 18 is a stack sensor board which interrupts the output line of the fuel cell stack 12 electrically to protect the fuel cell stack 12.

A plurality of (two, in the example of FIG. 1) positioning holes 94 are formed in a lower surface of the interruption control unit 18. The positioning projections 56 are inserted into the positioning holes 94. In the state where the interruption control unit 18 is placed in the recess 54, the interruption control unit 18 protrudes slightly above the upper surface 45 of the fourth wall 44*d*. It should be noted that, in the state where the interruption control unit 18 is placed in the recess 54, the interruption control unit 18 need not necessarily protrude above the upper surface 45 of the fourth wall 44*d*.

Operation of the fuel cell system 10 having such structure will be described below.

In FIG. 3, first, the oxygen-containing gas flows into the oxygen-containing gas flow field 42 of the first separator 30 from the auxiliary devices 82 through a predetermined channel, and the oxygen-containing gas is supplied to the cathode 38 of the membrane electrode assembly 28. In the meanwhile, the fuel gas flows from the auxiliary devices 82 through a predetermined channel into the fuel gas flow field 40 of the second separator 32, and the fuel gas is supplied to the anode 36 of the membrane electrode assembly 28. Therefore, in each of the membrane electrode assemblies 28, the oxygen-containing gas supplied to the cathode 38 and the fuel gas supplied to the anode 36 are partially consumed in the electrochemical reactions to generate electricity.

The fuel gas leaked from the fuel cell stack 12 into a space S1 between the fuel cell stack 12 and the case body 44 (hydrogen gas which permeated through the fuel cell stack 12) is guided into an internal space S2 of the ventilation portion 48, through a space between the other end surface 43 of the case body 44 and the inner surface 53 of the second end cover 46b, and then through the second screw hole 74 and the second insertion hole 70. At this time, the flow of the fuel gas from the second screw hole 74 and the second insertion hole 70 to the outside of the stack case 14 is prevented by the outer seal member 76. Further, the fuel gas guided into the placement hole 52 is guided into the internal space S2 of the ventilation portion 48 through the second screw hole 74b and the second insertion hole 70. The fuel gas guided into the internal space S2 of the ventilation portion 48 flows through the outlet holes 84, and the fuel gas is discharged to the outside of the fuel cell system 10 (fuel cell electric automobile) through a ventilation duct (not shown).

It should be noted that the flow of the fuel gas leaked from the fuel cell stack 12 into the first screw hole 64 and the first insertion hole 60 is prevented by the inner seal member 66. Further, leakage of the fuel cell stack 12 to the outside of the stack case 14 through a space between the lid cover 50 and the lower surface 47 of the case body 44 is prevented by the seal member 90.

In this case, the fuel cell system 10 according to the embodiment of the present invention offers the following advantages.

In the embodiment of the present invention, since the interruption control unit 18 is placed in the recess 54, it is possible to reduce the length of the interruption control unit 18 protruding from the outer surface of the case body 44 or position the entire interruption control unit 18 in the recess 54. Further, the first screw hole 64 penetrates from an end surface of the case body 44 to a side surface of the recess 54.

Therefore, in comparison with the case where the first screw hole 64 is formed in a bag shape which does not penetrate through a side surface of the recess 54, it is possible to form the recess 54 for providing the interruption control unit 18 in the case body 44 without increasing the entire length of the stack case 14 in the stacking direction of the plurality of power generation cells 20. Therefore, it is possible to provide the stack case 14 and the interruption control unit 18 in a compact space. Thus, in the case where the fuel cell system 10 is mounted in a vehicle (fuel cell electric vehicle), the stack case 14 and the interruption control unit 18 can be placed in a compact space of the collision protection case 200.

An inner seal member 66 is provided between the plurality of first screw holes 64 and the first opening 58a, for sealing the position between the case body 44 and the first end cover 46a in an air-tight manner.

In the structure, it is possible to prevent the fuel gas leaked from the fuel cell stack 12 to the space S1 from being leaked to the outside of the stack case 14 through the gap between the one end surface 41 of the case body 44 and the first end cover 46a by the inner seal member 66. Further, it is possible to prevent the fuel gas leaked from the fuel cell stack 12 into the space S1 from being guided into the recess 54 through the first screw hole 64.

The stack case 14 includes the ventilation portion 48 provided for the second end cover 46b in a manner to cover the plurality of second bolts 72 from the outside, for discharging the fuel gas leaked from the fuel cell stack 12 to the outside of the stack case 14. Among the plurality of second screw holes 74, the second screw hole 74a aligned with the recess 54 in the stacking direction is closed on one side of the recess 54 closer to the other end of the case body 44. The outer seal member 76 for sealing the position between the case body 44 and the second end cover 46b in an air-tight manner is provided between the plurality of second screw holes 74 and the outer surface of the case body 44.

In the structure, the fuel gas leaked from the fuel cell stack 12 into the space S1 can be discharged to the internal space S2 of the ventilation portion 48 through the second insertion hole 70. Further, it is possible to prevent the fuel gas which has flowed in the second insertion hole 70 and the second screw hole 74 from being leaked to the outside of the stack case 14 through the gap between the case body 44 and the second end cover 46b, by the outer seal member 76.

The fuel cell system 10 includes the cell voltage monitoring device 16 for monitoring the cell voltage of each of the plurality of power generation cells 20. The placement hole 52 is formed in the inner surface of the case body 44 for placing the cell voltage monitoring device 16 therein, in a manner that the placement hole 52 is interposed in the staking direction between at least one (first screw hole 64b) of the plurality of first screw holes 64 and at least one of the plurality of second screw holes 74 (second screw hole 74b) in the stacking direction. The second screw hole 74b among the plurality of second screw holes 74 aligned with the placement hole 52 in the stacking direction penetrates through the case body 44 from the other end surface 43 of the case body 44 to the side surface of the placement hole 52.

In the structure, it is possible to form the placement hole 52 in the case body 44 for placing the cell voltage monitoring device 16 in the placement hole 52, without increasing the entire length of the stack case 14. Further, the fuel gas discharged from the fuel cell stack 12 into the space S1 is discharged into the internal space S2 of the ventilation portion 48 through the placement hole 52, the second screw hole 74 and the second insertion hole 70.

Among the plurality of screw holes 64, the first screw hole 64b aligned with the placement hole 52 in the stacking direction is closed on the one side of the placement hole 52 closer to one end of the case body 44.

In the structure, it is possible to prevent the fuel gas leaked from the fuel cell stack 12 to the space S1 from being guided to the first screw hole 64b through the placement hole 52.

The placement hole 52 penetrates through the case body 44 in the direction perpendicular to the stacking direction. The stack case 14 includes the lid cover 50 tightened to the case body 44 by the plurality of third bolts 86 extending in the direction in which the placement hole 52 penetrates through the case body 44 in a manner to cover the placement hole 52 from the outside. A plurality of third screw holes 88 are formed in the surface (lower surface 47) of the case body 44 facing the lid cover 50. The plurality of third bolts 86 are screwed into the third screw holes 88. The seal member 90 for sealing the position between the case body 44 and the lid cover 50 in an air-tight manner is provided between the plurality of third screw holes 88 and the placement hole 52.

In the structure, it is possible to assemble the cell voltage monitoring device 16 in the placement hole 52 easily. Further, it is possible to prevent the fuel gas leaked from the fuel cell stack 12 into the space S1 from flowing to the outside of the stack case 14 through the gap between the lid cover 50 and the case body 44 by the seal member 90.

The third screw hole 88a among the plurality of third screw holes 88 positioned on one side closer to one end of the case body is connected to at least one of the plurality of first screw holes 64, and the third screw hole 88b among the plurality of third screw holes 88 positioned on one side closer to the other end of the case body 44 is connected to at least one of the plurality of second screw holes 74.

In the structure, it is possible to reduce the length of the case body 44 in the direction indicated by the arrow C.

The electrical equipment unit is the interruption control unit 18 that is capable of electrically interrupting the output line of the fuel cell stack 12. In the structure, it is possible to place the interruption control unit 18 in a compact space of the collision protection case 200.

The placement hole 52 may be formed in the first wall 44a or the second wall 44b. The electrical equipment unit is not limited to the interruption control unit 18. The electrical equipment unit may be a voltage control unit (VCU) for elevating the output voltage of the fuel cell stack 12. The fuel cell system according to the present invention is not limited to the above described embodiment. It is a matter of course that various structures can be obtained without departing from the gist of the present invention.

What is claimed is:

1. A fuel cell system comprising:
a fuel cell stack including a plurality of power generation cells that are stacked together;
a stack case containing the fuel cell stack; and
an electrical equipment unit provided in the stack case,
wherein the stack case comprises:
a case body configured to cover the fuel cell stack from a direction perpendicular to a direction in which the plurality of power generation cells are stacked together;
a first end cover tightened to the case body by a plurality of first bolts extending in the stacking direction in a manner to cover a first opening at one end of the case body; and
a second end cover tightened to the case body by a plurality of second bolts extending in the stacking direction in a manner to cover a second opening at another end of the case body, and
wherein a plurality of first screw holes are formed in one end surface of the case body, and the plurality of first bolts are configured to be screwed into the first screw holes in a state where the plurality of first bolts are inserted into a plurality of first insertion holes formed in the first end cover;
a plurality of second screw holes are formed in another end surface of the case body, and the plurality of second bolts are screwed into the plurality of second screw holes in a state where the plurality of second bolts are inserted into a plurality of second insertion holes formed in the second end cover;
a recess is formed in an outer surface of the case body in a manner that the recess is interposed in the stacking direction between at least one of the plurality of first screw holes and at least one of the second screw holes and that the electrical equipment unit is disposed in the recess;
a first screw hole among the plurality of first screw holes aligned with the recess in the stacking direction penetrates through the case body from one end surface to a side surface of the recess;
a ventilation portion provided for the second end cover in a manner to cover the plurality of second bolts from outside, and configured to discharge the fuel gas leaked from the fuel cell stack to outside of the stack case;
a second screw hole among the plurality of second screw holes aligned with the recess in the stacking direction is closed on one side of the recess closer to the other end of the case body; and
an outer seal member configured to seal a position between the case body and the second end cover in an air-tight manner is provided between the plurality of second screw holes and an outer surface of the case body and surrounds all of the plurality of second screw holes, and
wherein an outer groove in which the outer seal member is provided outside the plurality of second screw holes in the another end surface of the case body or outside the plurality of second screw holes in an inner surface of the second end cover, and
an internal space of the case body and an internal space of the ventilation portion are in communication with each other through the second insertion holes and a space between the another end surface of the case body and the inner surface of the second end cover, the space being positioned inwardly of the plurality of second screw holes and the plurality of second insertion holes.

2. The fuel cell system according to claim 1, wherein an inner seal member configured to seal a position between the case body and the first end cover in an air-tight manner is provided, between the plurality of first screw holes and the first opening.

3. The fuel cell system according to claim 1, wherein the fuel cell system includes a cell voltage monitoring device configured to monitor cell voltage of each of the plurality of power generation cells;
a placement hole where the cell voltage monitoring device is placed is formed in an inner surface of the case body, and interposed in the stacking direction between at least one of the plurality of first screw holes and at least one of the plurality of second screw holes; and
a second screw hole among the plurality of second screw holes aligned with the placement hole in the stacking direction penetrates through the case body from the other end surface of the case body to a side surface of the placement hole.

4. The fuel cell system according to claim 3, wherein a first screw hole among the plurality of first screw holes aligned with the placement hole in the stacking direction is closed on one side of the placement hole closer to one end of the case body.

5. The fuel cell system according to claim 3, wherein the placement hole penetrates through the case body in a direction perpendicular to the stacking direction;
the stack case includes a lid cover tightened to the case body by a plurality of third bolts extending in a direction in which the placement hole penetrates through the case body in a manner to cover the placement hole from the outside;

a plurality of third holes are formed in a surface of the case body facing the lid cover, and the plurality of third bolts are screwed into the plurality of third holes; and a seal member configured to seal a position between the case body and the lid cover is provided, between the plurality of third screw holes and the placement hole.

6. The fuel cell system according to claim 5, wherein a third screw hole among the plurality of third screw holes on one side of the case body closer to one end of the case body is connected to at least one of the plurality of first screw holes; and a third screw hole among the plurality of third screw holes on one side closer to the other end of the case body is connected to at least one of the plurality of second screw holes.

7. The fuel cell system according to claim 3, wherein the cell voltage monitoring device is placed in the placement hole in a manner that an opening of the second screw hole in the side surface of the placement hole is not closed.

8. The fuel cell system according to claim 1, wherein the electrical equipment unit is an interruption control unit configured to electrically interrupt an output line of the fuel cell stack.

9. The fuel cell system according to claim 1, wherein a positioning projection is provided in the bottom surface of the recess; and the electrical equipment unit has a positioning hole configured to allow the positioning projection to be inserted into the positioning hole.

* * * * *